United States Patent [19]
Deroover et al.

[11] Patent Number: 6,074,814
[45] Date of Patent: *Jun. 13, 2000

[54] PHOTOTHERMOGRAPHIC MATERIAL COMPRISING AN INFRA-RED SENSITIZER

[75] Inventors: Geert Deroover, Kessel-Lo; Herman Uytterhoeven, Bonheiden; Paul Callant, Edegem; Johan Loccufier, Zwijnaarde, all of Belgium

[73] Assignee: Agfa-Gevaert, Mortsel, Belgium

[*] Notice: This patent is subject to a terminal disclaimer.

[21] Appl. No.: 08/889,411

[22] Filed: Jul. 8, 1997

Related U.S. Application Data
[60] Provisional application No. 60/027,499, Sep. 27, 1996.

[30] Foreign Application Priority Data

Jul. 24, 1996 [EP] European Pat. Off. .............. 96202103

[51] Int. Cl.$^7$ ....................................... G03C 1/490
[52] U.S. Cl. .................. 430/619; 430/510; 430/531; 430/572; 430/584; 430/592; 430/611; 430/613
[58] Field of Search ...................... 430/350, 531, 430/619, 592, 944, 510, 584, 611, 572, 613

[56] References Cited

U.S. PATENT DOCUMENTS

| | | |
|---|---|---|
| 4,873,184 | 10/1989 | Simpson . |
| 5,223,389 | 6/1993 | Matsunaga et al. ............. 430/576 |
| 5,422,234 | 6/1995 | Bauer et al. ..................... 430/527 |
| 5,424,174 | 6/1995 | Motokatzu et al. .............. 430/350 |
| 5,424,182 | 6/1995 | Marginean, Sr. et al. ....... 430/617 |
| 5,441,866 | 8/1995 | Miller et al. . |
| 5,541,054 | 7/1996 | Miller et al. .................... 430/619 |

FOREIGN PATENT DOCUMENTS

| | | |
|---|---|---|
| 0559228 | 8/1993 | European Pat. Off. . |
| 58-028737 | 2/1983 | Japan . |
| 61-193142 | 8/1986 | Japan . |
| 63-023145 | 1/1988 | Japan . |
| WO 9615478 | 5/1996 | WIPO . |
| WO 963342 | 10/1996 | WIPO . |

OTHER PUBLICATIONS

J.A. Verdone, "Polymeric Binders for Photothermographic Materials" *Research Disclosure*, No. 186, Oct. 1979, Havant GB.

English Translation of JP 63 023 145 Fuji Photo Film KK Jan. 1988.

English Translation of JP 58 028 737 Konishiroku Photo KK Feb. 1983.

English Translation of JP 61 193 142 Kuraray KK Aug. 1986.

*Primary Examiner*—Thorl Chea
*Attorney, Agent, or Firm*—Baker Botts L.L.P.

[57] ABSTRACT

A photothermographic recording material comprising a photo-addressable thermally developable element including a substantially light-insensitive organic silver salt, photosensitive silver halide in catalytic association with the substantially light-insensitive organic silver salt, in a quantity of 0.1 to 35 mol % relative to the organic silver salt and spectrally sensitized to infra-red light with a dye, a supersensitizer for the dye, a reducing agent in thermal working relationship with the substantially light-insensitive organic silver salt and a binder, wherein the binder comprises a water soluble polymer, a water-dispersible polymer or a water soluble polymer and a water-dispersible polymer and the dye is represented by formula (I):

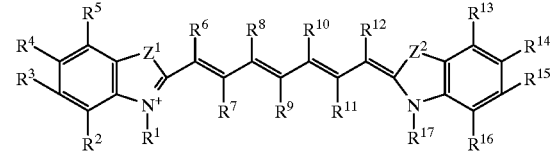

wherein $Z^1$ and $Z^2$ independently represent S, O or Se; $R^1$ and $R^{17}$ are independently each an alkyl or sulfo-alkyl group which may be substituted with at least one fluorine, chlorine, bromine, iodine or an alkoxy-, aryloxy- or ester-group; and X represents an anion.

19 Claims, No Drawings

PHOTOTHERMOGRAPHIC MATERIAL COMPRISING AN INFRA-RED SENSITIZER

This application claims the benefit of U.S. Provisional application Ser. No. 60/027,499 filed Sep. 27, 1996.

DESCRIPTION

1. Field of the Invention

The present invention relates to a photothermographic recording material comprising a photo-addressable thermally developable element comprising a species which increases the infrared sensitivity thereof.

2. Background of the Invention

Thermal imaging or thermography is a recording process wherein images are generated by the use of thermal energy.

In thermography three approaches are known:

1. Direct thermal formation of a visible image pattern by imagewise heating of a recording material containing matter that by chemical or physical process changes colour or optical density;
2. Imagewise transfer of an ingredient necessary for the chemical or physical process bringing about changes in colour or optical density to a receptor element;
3. Thermal dye transfer printing wherein a visible image pattern is formed by transfer of a coloured species from an imagewise heated donor element onto a receptor element.

Thermographic materials of type 1 become photothermographic when a photosensitive agent is present which after exposure to UV, visible or IR light is capable of catalyzing or participating in a thermographic process bringing about changes in colour or optical density. Examples of photothermographic materials are the so called "Dry Silver" photographic materials of the 3M Company, which are reviewed by D. A. Morgan in "Handbook of Imaging Science", edited by A. R. Diamond, page 43, published by Marcel Dekker in 1991.

In U.S. Pat. No. 5,441,866 it is stated that: "While many of such dyes (dyes which impart spectral sensitivity to a gelatino silver halide element) provide spectral sensitization in photothermographic formulations the dye sensitization is often very inefficient and it is not possible to translate the performance of a dye in gelatino silver halide elements to photothermographic elements."

U.S. Pat. No. 5,441,866 discloses a heat-developable photothermographic element comprising a preferably hydrophobic binder, supersensitizer, preferably selected from the group consisting of aromatic, heterocyclic mercapto or disulfide compounds, and a spectrally sensitizing amount of an infrared absorbing dye having the central nucleus:

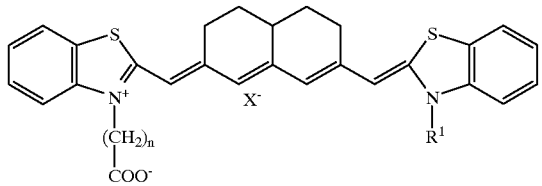

wherein $R^1$ represents a $(CH_2)_n$—$COO^-$ group of from 1–20 carbon atoms, or an alkyl group of from 1 to 20 carbon atoms; and n is an integer from 1 to 20; and EP-A 616 014 discloses a heptamethine cyanine dye characterised in that both nitrogen atoms of the cyanine chromophore bear a 5 carboxyalkyl substituent comprising an alkyl chain of at least five carbon atoms, which may be used in conjunction with supersensitizers such as 2-mercaptobenzimidazoles, metal chelating agents and pyridine, pyrimidine and triazine derivatives.

U.S. Pat. No. 4,873,184 discloses a spectrally sensitized silver halide photothermographic emulsion layer comprising a reducible silver source material as 20 to 70% by weight of said emulsion layer, photosensitive silver halide, and a reducing agent for silver ion, said silver halide having no latent image therein and being present as 1.5 to 7.0% by weight of said emulsion layer and said emulsion layer having a speed increasing effective amount of a metal complexing agent therein in an amount equal to 0.4 to 40% by weight of total silver in said emulsion.

WO 96/33442A discloses a heat developable, photothermographic element comprising a support bearing at least one photosensitive, image-forming layer comprising: (a) a photosensitive silver halide; (b) a non-photosensitive, reducible silver source; (c) a reducing agent for silver ions; (d) a binder; and (e) a spectrally sensitizing amount of a compound having the central nucleus:

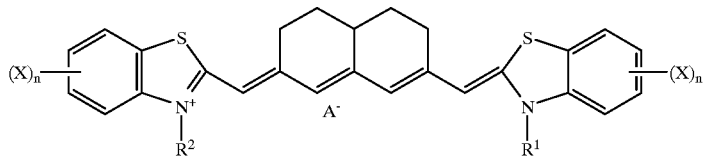

wherein: X is independently a thioalkyl group of from 1 to 20 carbon atoms; n is independently 0, 1 or 2 with the total of n's being at least 1; $R^1$ and $R^2$ represent an alkyl group of from 1 to 20 carbon atoms other than carboxy-substituted alkyl; and $A^-$ is an anion.

The detailed descriptions and invention examples of U.S. Pat. No. 4,873,184, U.S. Pat. No. 5,441,866 and WO 96/33442 are all confined to photo-addressable thermally developable elements coated from non-aqueous media. This reflects the standard teaching over such photothermographic materials, but for economic, safety and ecological reasons, it is desirable to coat such materials from aqueous media. However, the extrapolation of materials technology for photothermographic materials based on organic silver salts/silver halide/reducing agent-systems coated from non-aqueous media is by no means self-evident as is borne out by the inventors' investigation of the spectral sensitization of such photothermographic materials coated from aqueous media.

3. Objects of the Invention

It is a first object of the invention to provide a photothermographic recording material with a high infra-red sensitivity and excellent image-forming properties.

It is a second object of the invention to provide a photothermographic recording material comprising a photo-addressable thermally developable element based on a substantially light-insensitive organic silver salt, photosensitive silver halide in catalytic association therewith and an organic reducing agent for the organic silver salt, which is produceable without necessitating intermediate drying of the organic silver salt.

It is a third object of the invention to provide a photo-addressable thermally developable element with excellent image-forming properties, which can be coated from aqueous media.

It is a yet a still further object of the invention to provide a recording process for a photothermographic recording material with the above improved characteristics.

Further objects and advantages of the invention will become apparent from the description hereinafter.

SUMMARY OF THE INVENTION

According to the present invention a photothermographic recording material is provided comprising a support and a photo-addressable thermally developable element includingprising a substantially light-insensitive organic silver salt, photosensitive silver halide in catalytic association with the substantially light-insensitive organic silver salt and spectrally sensitized to infra-red light with a dye, a supersensitizer for the dye, a reducing agent in thermal working relationship with the substantially light-insensitive organic silver salt and a binder, characterized in that the binder comprises a water soluble polymer, a water-dispersible polymer or a water soluble polymer and a water-dispersible polymer and the dye corresponds to the general formula (I):

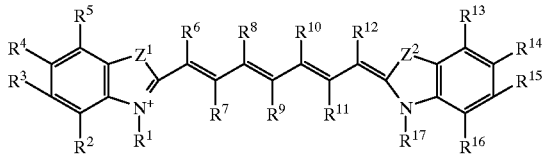

wherein $Z^1$ and $Z^2$ independently represent S, O or Se; $R^1$ and $R^{17}$ are independently each an alkyl or sulfo-alkyl group which may be substituted with at least one fluorine, chlorine, bromine, iodine or an alkoxy-, aryloxy- or ester-group; $R^2$, $R^3$, $R^4$, $R^5$, $R^{13}$, $R^{14}$, $R^{15}$ and $R^{16}$ are independently each hydrogen, chlorine, bromine, fluorine, a nitro-group, a cyano-group or a keto-, sulfo-, carboxy-, ester-, sulfonamide-, amide-, dialkylamino-, alkyl-, alkenyl-, hetero-aromatic, aryl-, alkoxy- or aryloxy-group; or each of $R^2$ together with $R^3$, $R^3$ together with $R^4$, $R^4$ together with $R^5$, $R^{13}$ together with $R^{14}$, $R^{14}$ together with $R^{15}$ and $R^{15}$ together with $R^{16}$ may independently constitute the atoms necessary to complete a benzene ring; $R^6$, $R^7$, $R^8$, $R^9$, $R^{10}$, $R^{11}$ and $R^{12}$ independently represent hydrogen, an alkyl group, chlorine, fluorine, bromine, iodine, a disubstituted amino group, wherein the substituents may constitute the atoms necessary to form a 5-ring atom or 6-ring atom heterocyclic ring, or each of $R^6$ together with $R^8$, $R^8$ together with $R^{10}$, $R^{10}$ together with $R^{12}$ and $R^9$ together with $R^{11}$ may independently constitute the atoms necessary to complete a 5-atom or 6-atom carbocyclic or heterocyclic ring; $R^7$ together with $R^9$ may independently constitute the atoms necessary to complete a 5-atom heterocyclic ring, a 6-atom heterocyclic ring or a 5-atom carbocyclic ring; each of $R^1$ together with $R^6$ and $R^{12}$ together with $R^{17}$ may independently constitute the atoms necessary to complete a 5-atom or 6-atom heterocyclic ring; and $X^-$ represents an anion.

A process is also provided producing a photothermographic recording material, as referred to above, comprising the steps of: (i) producing an aqueous dispersion or aqueous dispersions comprising the substantially light-insensitive organic silver salt, the photosensitive silver halide spectrally sensitized to infra-red light with the dye, the supersensitizer for the dye, the reducing agent and the binder; (ii) coating the aqueous dispersion or aqueous dispersions onto a support.

A recording process for a photothermographic recording material is further provided comprising the steps of: imagewise exposing to infrared actinic radiation a photothermographic recording material as referred to above or produced as referred to above and overall heating of the photothermographic recording material.

Preferred embodiments of the present invention are disclosed in the detailed description of the invention.

DETAILED DESCRIPTION OF THE INVENTION

Aqueous

The term aqueous for the purposes of the present invention includes mixtures of water with water-miscible organic solvents such as alcohols e.g. methanol, ethanol, 2-propanol, butanol, iso-amyl alcohol, octanol, cetyl alcohol etc; glycols e.g. ethylene glycol; glycerine; N-methyl pyrrolidone; methoxypropanol; and ketones e.g. 2-propanone and 2-butanone etc.

Spectral Sensitizer

According to the present invention the photothermographic material comprises a photo-addressable thermally developable element comprising a dye corresponding to the general formula (I). In dyes according to general formula (I) used in the present invention substitutable substituents and rings in the dye may also be substituted.

In a particularly preferred embodiment, according to the present invention, in formula (I) $R^1$ and $R^{17}$ each independently represent an alkyl group consisting of 1 to 6 carbon atoms.

In an especially preferred embodiment, according to the present invention, the dye corresponds to the formula

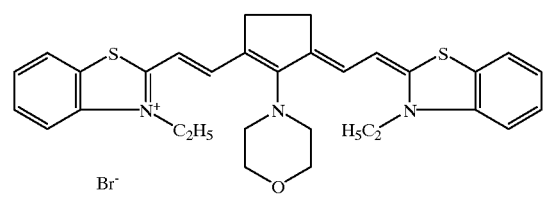

Suitable infra-red sensitizing dyes for photosensitive silver halide, according to the present invention, are the N-alkyl benzothiazole heptamethine cyanine dyes:

* SENSI 01
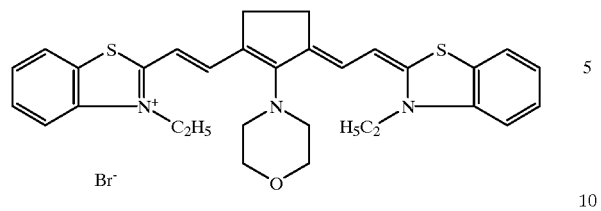
the N-alkylsulfo benzothiazole heptamethine cyanine dyes:
* SENSI 02
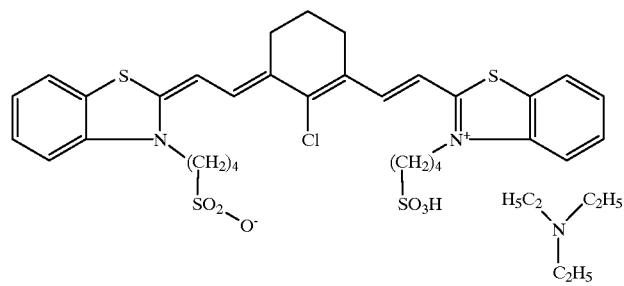
* SENSI 03
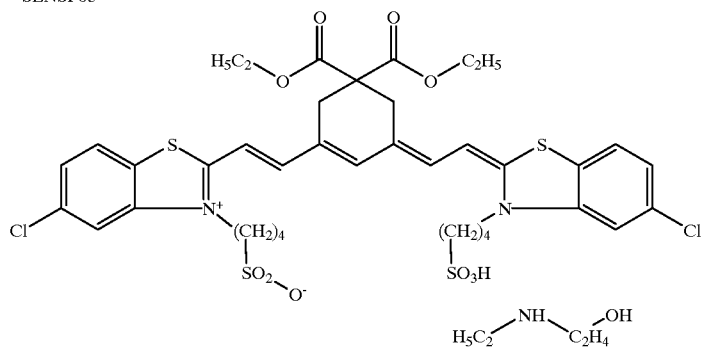
* SENSI 04
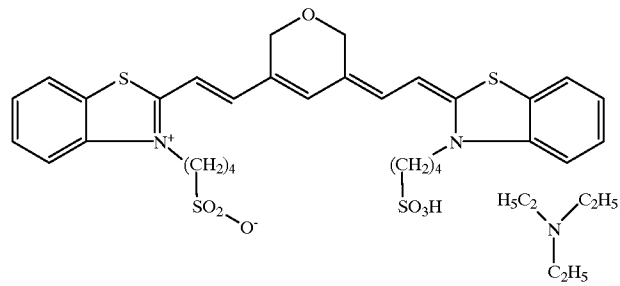
* SENSI 05
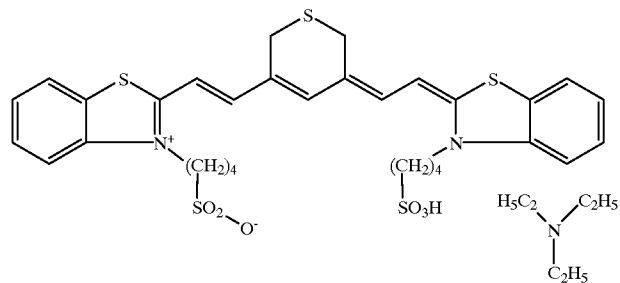

* SENSI 06

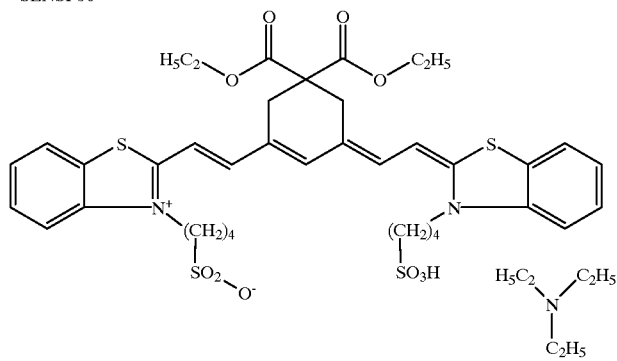

Supersensitizers

Suitable supersensitizers for use with the dyes, used in the present invention, are disclosed in EP-A's 559 228 and 587 338 and in the U.S. Pat. Nos. 3,877,943 and 4,873,184.

In a particularly preferred embodiment, as used in the present invention, the supersensitizer is a compound selected from the group consisting of stilbene compounds, hydrazine compounds and triazine compounds.

Particularly preferred stilbene supersensitizers, according to the present invention, are:

* SS-01:

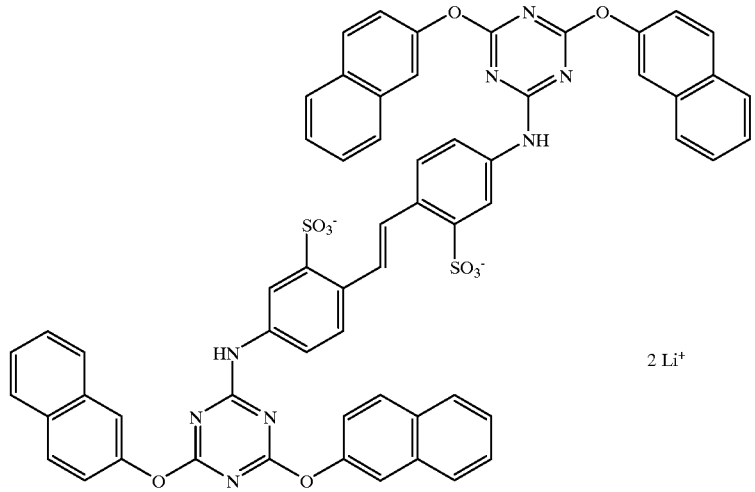

* SS-02:

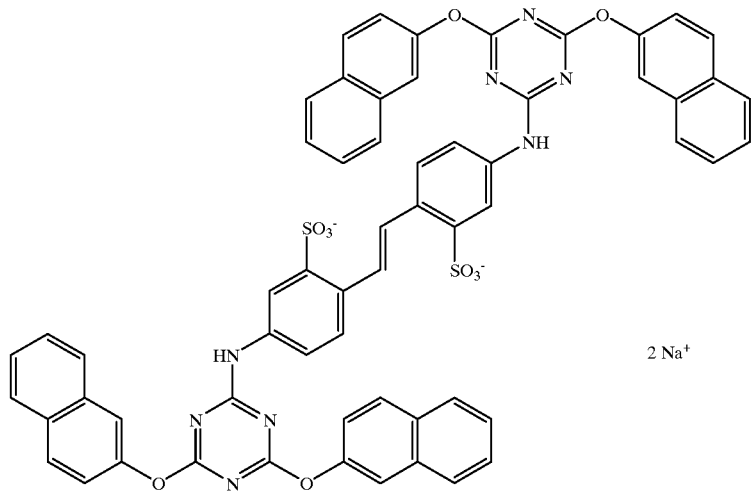

\* SS-03:
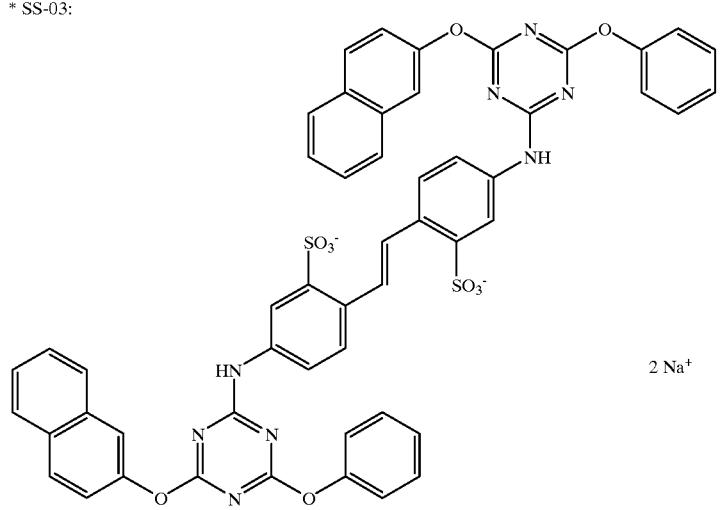
2 Na⁺
\* SS-04:
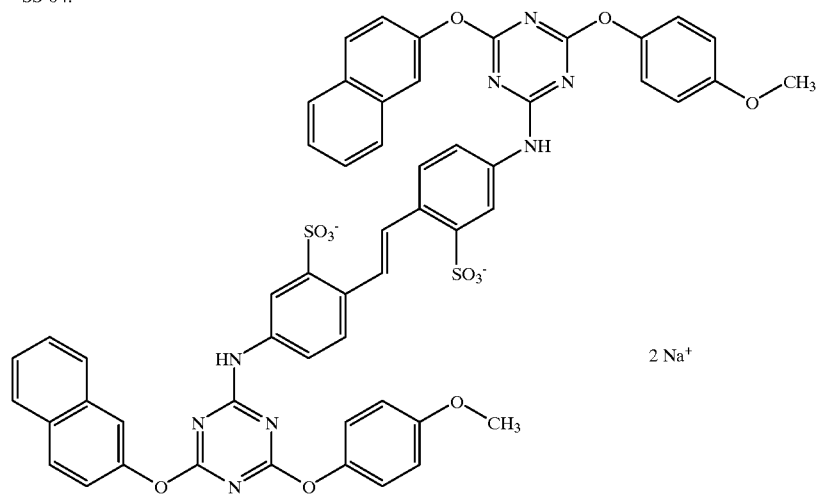
2 Na⁺
\* SS-05:
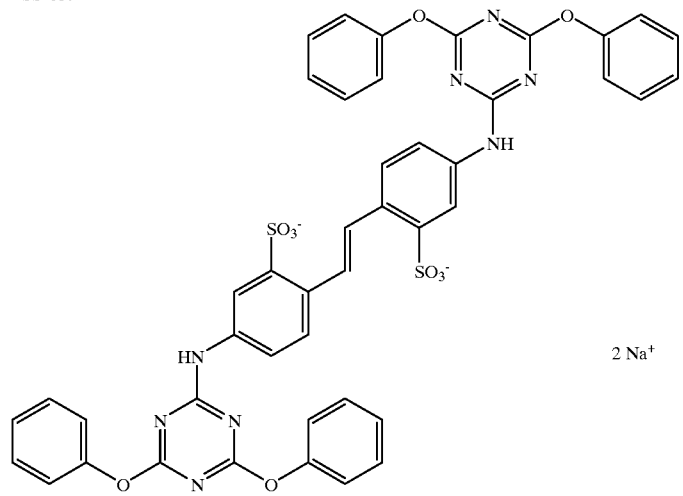
2 Na⁺

-continued

* SS-06:

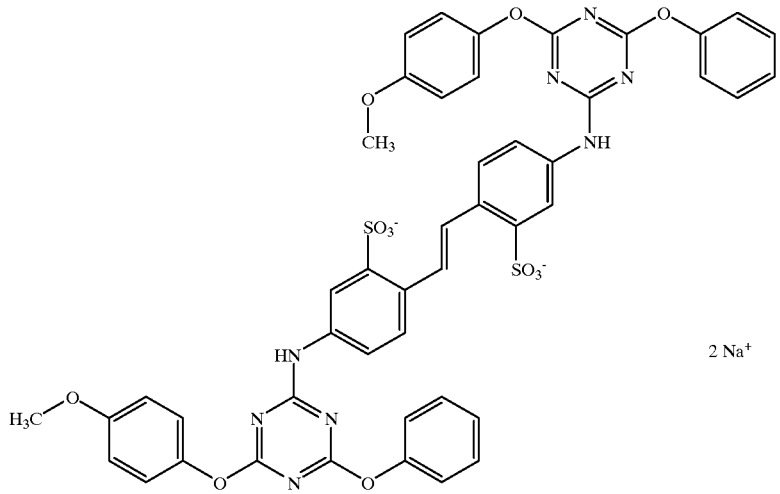

2 Na⁺

* SS-07:

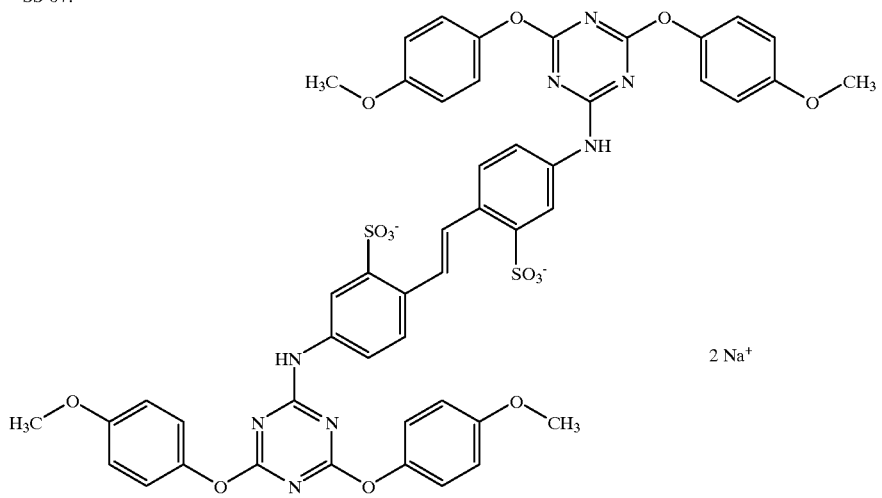

2 Na⁺

Water-dispersible and Water-soluble Binders

According to the present invention the photo-addressable thermally developable element includes a binder comprising a water-soluble binder, a water-dispersible binder or a mixture of a water soluble binder and a water-dispersible binder. An important prerequisite in the choice of binders and binder-mixtures is their ability to form a continuous layer with the other ingredients present.

The water-dispersible binder can be any water-insoluble polymer e.g. water-insoluble cellulose derivatives, polymers derived from α,β-ethylenically unsaturated compounds such as polyvinyl chloride, after-chlorinated polyvinyl chloride, copolymers of vinyl chloride and vinylidene chloride, copolymers of vinyl chloride and vinyl acetate, polyvinyl acetate and partially hydrolyzed polyvinyl acetate, polyvinyl alcohol, polyvinyl acetals that are made from polyvinyl alcohol as starting material in which only a part of the repeating vinyl alcohol units may have reacted with an aldehyde, preferably polyvinyl butyral, copolymers of acrylonitrile and acrylamide, polyacrylic acid esters, polymethacrylic acid esters, polystyrene and polyethylene or mixtures thereof. It should be noted that there is no clear cut transition between a polymer dispersion and a polymer solution in the case of very small polymer particles resulting in the smallest particles of the polymer being dissolved and those slightly larger being in dispersion.

Suitable water-soluble polymers, according to the present invention, are: polyvinyl alcohol, polyacrylamide, polyacrylic acid, polymethacrylic acid, polyethyleneglycol, proteins, such as gelatin and modified gelatins such as phthaloyl gelatin, polysaccharides, such as starch, gum arabic and dextran and water-soluble cellulose derivatives.

To improve the layer-forming properties of water-soluble and water-dispersible polymers, plasticizers can be incorporated into the polymers, water-miscible solvents can be added to the dispersion medium and mixtures of water-soluble polymers, mixtures of water-dispersible polymers, or mixtures of water-soluble and water-dispersible polymers may be used.

Photo-addressable Thermally Developable Element

The photo-addressable thermally developable element, according to the present invention, comprises a substantially light-insensitive organic silver salt, photosensitive silver halide in catalytic association therewith and an organic reducing agent in thermal working relationship with the substantially light-insensitive organic silver salt and a water soluble or water-dispersible binder. The element may include a layer system with the silver halide in catalytic association with the substantially light-insensitive organic silver salt, spectral sensitizer optionally together with a supersensitizer in intimate sensitizing association with the silver halide particles and the other ingredients active in the thermal development process or pre- or post-development stabilization of the element being in the same layer or in other layers with the proviso that the organic reducing agent and the toning agent, if present, are in thermal working relationship with the substantially light-insensitive organic silver salt i.e. during the thermal development process the reducing agent and the toning agent, if present, are able to diffuse to the substantially light-insensitive organic silver salt.

Light-insensitive Organic Silver Salts

Preferred substantially light-insensitive organic silver salts produced using the process according to the present invention and used in the photothermographic materials, according to the present invention, are silver salts of organic carboxylic acids having as their organic group: aryl, aralkyl, alkaryl or alkyl. For example aliphatic carboxylic acids known as fatty acids, wherein the aliphatic carbon chain has preferably at least 12 C-atoms, e.g. silver laurate, silver palmitate, silver stearate, silver hydroxystearate, silver oleate and silver behenate, which silver salts are also called "silver soaps". Silver salts of modified aliphatic carboxylic acids with thioether group, as described e.g. in GB-P 1,111,492, may likewise be used to produce a thermally developable silver image.

In a preferred embodiment, according to the present invention, the substantially light-insensitive organic silver salt is a silver salt of a fatty acid.

The term substantially light-insensitive organic silver salt for the purposes of the present invention also includes mixtures of organic silver salts.

Binder to Organic Silver Salt Ratio

The binder to organic silver salt weight ratio is preferably in the range of 0.2 to 6, and the thickness of the recording layer is preferably in the range of 1 to 50 µm.

Production of Particles of Organic Silver Salt

Particles of the organic silver salts are prepared by the reaction of a soluble silver salt with the organic carboxylic acid or a salt thereof.

According to a process, according to the present invention, the suspension of particles of a substantially light-insensitive organic silver salt may be produced by simultaneous metered addition of an aqueous solution or suspension of an organic carboxylic acid, or its salt, and an aqueous solution of a silver salt to an aqueous liquid and the metered addition of the aqueous solution or suspension of the organic carboxylic acid or its salt; and/or the aqueous solution of the silver salt is regulated by the concentration of silver ions or the concentration of anions of the silver salt in the aqueous liquid as disclosed in EP-A 754 969.

Photosensitive Silver Halide

The photosensitive silver halide used in the present invention may be employed in a range of 0.1 to 35 mol percent of substantially light-insensitive organic silver salt, with the range of 0.5 to 20 mol percent being preferred and the range of 1 to 12 mol percent being particularly preferred.

The silver halide may be any photosensitive silver halide such as silver bromide, silver iodide, silver chloride, silver bromoiodide, silver chlorobromoiodide, silver chlorobromide etc. The silver halide may be in any form which is photosensitive including, but not limited to, cubic, orthorhombic, tabular, tetrahedral, octagonal etc. and may have epitaxial growth of crystals thereon.

The silver halide used in the present invention may be employed without modification. However, it may be chemically sensitized with a chemical sensitizing agent such as a compound containing sulphur, selenium, tellurium etc., or a compound containing gold, platinum, palladium, iron, ruthenium, rhodium or iridium etc., a reducing agent such as a tin halide etc., or a combination thereof. The details of these procedures are described in T. H. James, "The Theory of the Photographic Process", Fourth Edition, Macmillan Publishing Co. Inc., New York (1977), Chapter 5, pages 149 to 169.

According to a preferred embodiment used in the present invention, particles of the photosensitive silver halide are non-aggregating in the photo-addressable thermally developable element and are uniformly distributed over and between particles of the substantially light-insensitive organic silver salt, at least 80% by number of the particles having a diameter, determined by transmission electron microscopy, of $\leq 40$ nm.

Emulsion of Organic Silver Salt and Photosensitive Silver Halide

The silver halide may be added to the photo-addressable thermally developable element in any fashion which places it in catalytic proximity to the substantially light-insensitive organic silver salt. Silver halide and the substantially light-insensitive organic silver salt which are separately formed, i.e. ex-situ or "preformed", in a binder can be mixed prior to use to prepare a coating solution, but it is also effective to blend both of them for a long period of time. Furthermore, it is effective to use a process which comprises adding a halogen-containing compound to the organic silver salt to partially convert the substantially light-insensitive organic silver salt to silver halide as disclosed in U.S. Pat. No. 3,457,075.

The aqueous emulsion of the organic silver salt optionally including photosensitive silver halide can, according to the present invention, also be produced from particles of the organic silver salt optionally containing photosensitive silver halide by dispersing the particles in water in the presence of non-ionic or anionic surfactants or a mixture of non-ionic and anionic surfactants using any dispersion technique known to one skilled in the art such as ball milling, dispersion in a impingement mill (rotor-stator mixer), dispersion in a microfluidizer etc. A combination of dispersion techniques may also be used, for example using a first technique to produce a predispersion and a second technique to produce a fine dispersion.

Onium Halides and Polyhalides

According to the present invention photosensitive silver halide particles produced by reacting an aqueous dispersion of particles of the substantially light-insensitive organic silver salt with at least one onium salt with halide or polyhalide anions may be present. Onium cations, according to the present invention, may be polymeric or non-polymeric. Preferred non-polymeric onium salts for partial conversion of particles of substantially light-insensitive organic silver salt into photosensitive silver halides according to the present invention are:

PC01=3-(triphenyl-phosphonium)propionic acid bromide perbromide

PC02=3-(triphenyl-phosphonium)propionic acid bromide

PC03=3-(triphenyl-phosphonium)propionic acid iodide

The onium salts are present in quantities of between 0.1 and 35 mol % with respect to the quantity of substantially light-insensitive organic silver salt of organic, with quantities between 0.5 and 20 mol % being preferred and with quantities between 1 and 12 mol % being particularly preferred.

Organic Reducing Agent

Suitable organic reducing agents for the reduction of the substantially light-insensitive organic heavy metal salts are organic compounds containing at least one active hydrogen atom linked to O, N or C. Particularly suitable organic reducing agents for the reduction of the substantially light-insensitive organic silver salt, an organic reducing agent for the substantially light-insensitive organic silver salt are non-sulfo-substituted 6-membered aromatic or heteroaromatic ring compounds with at least three substituents one of which is a hydroxy group at a first carbon atom and a second of which is a hydroxy or amino-group substituted on a second carbon atom one, three or five ring atoms removed in a system of conjugated double bonds from the first carbon atom in the compound, in which (i) the third substituent may be part of an annelated carbocyclic or heterocyclic ring system; (ii) the third substituent or a further substituent is not an aryl- or oxo-aryl-group whose aryl group is substituted with hydroxy-, thiol- or amino-groups; and (iii) the third substituent or a further substituent is a non-sulfo-electron withdrawing group if the second substituent is an amino-group.

Particularly preferred reducing agents are substituted catechols or substitued hydroquinones with 3-(3',4'-dihydroxyphenyl)-propionic acid, 3',4'-dihydroxy-butyrophenone, methyl gallate, ethyl gallate and 1,5-dihydroxy-naphthalene being especially preferred.

During the thermal development process the reducing agent must be present in such a way that it is able to diffuse to the substantially light-insensitive organic silver salt particles so that reduction of the substantially light-insensitive organic silver salt can take place.

Auxiliary Reducing Agents

The above mentioned reducing agents, regarded as primary or main reducing agents, may be used in conjunction with so-called auxiliary reducing agents. Auxiliary reducing agents that may be used in conjunction with the above mentioned primary reducing agents are sulfonyl hydrazide reducing agents such as disclosed in U.S. Pat. No. 5,464,738, trityl hydrazides and formyl-phenyl-hydrazides such as disclosed in U.S. Pat. No. 5,496,695 and organic reducing metal salts, e.g. stannous stearate described in U.S. Pat. Nos. 3,460,946 and 3,547,648.

Thermal Solvents

The above mentioned binders or mixtures thereof may be used in conjunction with waxes or "heat solvents" also called "thermal solvents" or "thermosolvents" improving the reaction speed of the redox-reaction at elevated temperature.

By the term "heat solvent" in this invention is meant a non-hydrolyzable organic material which is in a solid state in the recording layer at temperatures below 50° C., but becomes a plasticizer for the recording layer where thermally heated and/or a liquid solvent for at least one of the redox-reactants, e.g. the reducing agent for the substantially light-insensitive organic silver salt, at a temperature above 60° C.

Toning Agents

In order to obtain a neutral black image tone in the higher densities and neutral grey in the lower densities, photothermographic materials according to the present invention may contain one or more toning agents. The toning agents should be in thermal working relationship with the substantially light-insensitive organic silver salts and reducing agents during thermal processing. Any known toning agent from thermography or photothermography may be used.

Suitable toning agents are succinimide and the phthalimides and phthalazinones within the scope of the general formulae described in U.S. Pat. No. 4,082,901 and the toning agents described in U.S. Pat. No. 3,074,809, U.S. Pat. No. 3,446,648 and U.S. Pat. No. 3,844,797. Particularly useful toning agents are the heterocyclic toner compounds of the benzoxazine dione or naphthoxazine dione type as described in GB-P 1,439,478 and U.S. Pat. No. 3,951,660.

Stabilizers and Antifoggants

In order to obtain improved shelf-life and reduced fogging, stabilizers and antifoggants may be incorporated into the photothermographic materials of the present invention. Examples of suitable stabilizers and antifoggants and their precursors, which can be used alone or in combination, include the thiazolium salts described in U.S. Pat. Nos. 2,131,038 and 2,694,716; the azaindenes described in U.S. Pat. Nos. 2,886,437 and 2,444,605; the urazoles described in U.S. Pat. No. 3,287,135; the sulfocatechols described in U.S. Pat. No. 3,235,652; the oximes described in GB-P 623,448; the thiuronium salts described in U.S. Pat. No. 3,220,839; the palladium, platinum and gold salts described in U.S. Pat. Nos. 2,566,263 and 2,597,915; the tetrazolyl-thio-compounds described in U.S. Pat. No. 3,700,457; the mesoionic 1,2,4-triazolium-3-thiolate stablizer precursors described in U.S. Pat. Nos. 4,404,390 and 4,351,896; the tribromomethyl ketone compounds described in EP-A 600 587; the combination of isocyanate and halogenated compounds described in EP-A 600 586; the vinyl sulfone and β-halo sulfone compounds described in EP-A 600 589; and those compounds mentioned in this context in Chapter 9 of "Imaging Processes and Materials, Neblette's 8th edition", by D. Kloosterboer, edited by J. Sturge, V. Walworth and A. Shepp, page 279, Van Nostrand (1989); in Research Disclosure 17029 published in June 1978; and in the references cited in all these documents.

Surfactants

Non-ionic, cationic or anionic surfactants may be used, according to the present invention, to produce dispersions of particles of the substantially light-insensitive organic silver salt in aqueous media and to disperse water-dispersible binders, such as polymer latexes, in aqueous media. In a preferred embodiment used in the present invention the surfactant is a sulfonate e.g. alkyl, aryl, alkaryl or aralkyl sulfonate, with alkyl and alkaryl sulfonates being particularly preferred e.g.:

MERSOLAT™ H. a sodium salt of an alkyl sulfonate from BAYER

ULTRAVON™ W. a sodium salt of an aryl sulfonate from CIBA-GEIGY

Additional Ingredients

In addition to the ingredients the photothermographic material may contain other additives such as free organic carboxylic acids, surface-active agents, antistatic agents, e.g. non-ionic antistatic agents including a fluorocarbon group as e.g. in $F_3C(CF_2)_6CONH(CH_2CH_2O)$—H, silicone oil, e.g. BAYSILONE O1 A (tradename of BAYER AG—GERMANY), ultraviolet light absorbing compounds, white light reflecting and/or ultraviolet radiation reflecting pigments, silica, and/or optical brightening agents.

Antihalation Dyes

According to a preferred embodiment of the present invention, the photothermographic recording material further comprises an antihalation or acutance dye which absorbs light which has passed through the photosensitive layer, thereby preventing its reflection. Such dyes may be incorporated into the photo-addressable thermally developable element or in any other layer comprising the photothermographic recording material of the present invention. The antihalation dye may also be bleached either thermally during the thermal development process or photo-bleached after removable after the thermal development process and it may be contained in a layer which can be removed subsequent to the exposure process. Suitable antihalation dyes for use with infra-red light are described in the EP-A's 377 961 and 652 473, the EP-B's 101 646 and 102 781 and the U.S. Pat. Nos. 4,581,325 and 5,380,635.

Support

The support for the photothermographic recording material according to the present invention may be transparent, translucent or opaque, e.g. having a white light reflecting aspect and is preferably a thin flexible carrier made e.g. from paper, polyethylene coated paper or transparent resin film, e.g. made of a cellulose ester, e.g. cellulose triacetate, corona and flame treated polypropylene, polystyrene, polymethacrylic acid ester, polycarbonate or polyester, e.g. polyethylene terephthalate or polyethylene naphthalate as disclosed in GB 1,293,676, GB 1,441,304 and GB 1,454,956. For example, a paper base substrate is present which may contain white reflecting pigments, optionally also applied in an interlayer between the recording material and the paper base substrate.

The support may be in sheet, ribbon or web form and subbed if needs be to improve the adherence to the thereon coated heat-sensitive recording layer.

Suitable subbing layers for improving the adherence of the thermosensitive element and the antistatic layer outermost backing layer of the present invention for polyethylene terephthalate supports are described e.g. in GB-P 1,234,755, U.S. Pat. Nos. 3,397,988; 3,649,336; 4,123,278 and U.S. Pat. No. 4,478,907 which relates to subbing layers applied from aqueous dispersion of sulfonated copolyesters, and further the subbing layers described in Research Disclosure published in Product Licensing Index, July 1967, p. 6.

Suitable pretreatments of hydrophobic resin supports are, for example, treatment with a corona discharge and/or attack by solvent(s), thereby providing a micro-roughening.

Protective Layer

According to a preferred embodiment of the photothermographic recording material of the present invention, the photo-addressable thermally developable element is provided with a protective layer.

The protective layer preferably comprises a binder, which may be solvent soluble (hydrophobic), solvent dispersible, water soluble (hydrophilic) or water dispersible. Among the hydrophobic binders polycarbonates as described in EP-A 614 769 are particularly preferred. Suitable hydrophilic binders are, for example, gelatin, polyvinylalcohol, cellulose derivatives or other polysaccharides, hydroxyethylcellulose, hydroxypropylcellulose etc., with hardenable binders being preferred and polyvinylalcohol being particularly preferred.

A protective layer according to the present invention may be crosslinked. Crosslinking can be achieved by using crosslinking agents such as described in WO 95/12495 for protective layers. A protective layer used in the present invention may include in addition at least one solid lubricant having a melting point below 150° C. and at least one liquid lubricant in a binder, wherein at least one of the lubricants is a phosphoric acid derivative, further dissolved lubricating material and/or particulate material, e.g. talc particles, optionally protruding from the outermost layer. The lubricant may be applied with or without a polymeric binder. Such protective layers may also comprise particulate material, e.g. talc particles, optionally protruding from the protective outermost layer as described in WO 94/11198. Other additives can also be incorporated in the protective layer e.g. colloidal particles such as colloidal silica.

Antistatic Layer

In a preferred embodiment the recording material of the present invention an antistatic layer is applied to the outermost layer on the side of the support not coated with the photo-addressable thermally developable element. Suitable antistatic layers therefor are described in EP-A's 444 326, 534 006 and 644 456, U.S. Pat. Nos. 5,364,752 and 5,472, 832 and DOS 4125758.

Coating Techniques

The coating of any layer of the photothermographic materials of the present invention may proceed by any coating technique e.g. such as described in Modern Coating and Drying Technology, edited by Edward D. Cohen and Edgar B. Gutoff, (1992) VCH Publishers Inc. 220 East 23rd Street, Suite 909 New York, N.Y. 10010, U.S.A.

Recording Process

Photothermographic materials, according to the present invention, may be exposed with infrared radiation at wavelengths between 700 and 1100 nm with the image either being obtained by pixel-wise exposure with a finely focussed light source, such as an IR wavelength laser or an IR-laser diode, e.g. emitting at 780 nm, 830 nm or 850 nm; or by direct exposure to the object itself or an image therefrom illuminated with IR light.

For the thermal development of image-wise exposed photothermographic recording materials, according to the present invention, any sort of heat source can be used that enables the recording materials to be uniformly heated to the development temperature in a time acceptable for the application concerned e.g. contact heating, radiative heating, microwave heating etc.

According to the present invention a photothermographic recording process is, in which only heat and the photothermographic recording material are involved in the thermal development process and the heat is supplied by conduction, convection or radiation.

Applications

The photothermographic recording materials of the present invention can be used for both the production of transparencies and reflection type prints. This means that the support will be transparent or opaque, e.g. having a white light reflecting aspect. For example, a paper base substrate is present which may contain white reflecting pigments, optionally also applied in an interlayer between the recording material and the paper base substrate. Should a transparent base be used, the base may be colourless or coloured, e.g. has a blue colour.

In the hard copy field photothermographic recording materials on a white opaque base are used, whereas in the medical diagnostic field black-imaged transparencies are widely used in inspection techniques operating with a light box.

The following ingredients in addition to those mentioned above were used in the photothermographic recording materials of the examples and comparative examples illustrating this invention:
the following supersensitizers in addition to those mentioned above:
  SS-08: 2-mercaptobenzimidazole;
  SS-09: 2-mercaptobenzothiazole-5-[N-(4'-chlorophenyl)] sulfonamide.
the following IR-sensitizing dye according to U.S. Pat. No. 5,441,866:

and the latex binder:
  BINDER 01: copolymer consisting of 45% by weight of methylmethacrylate, 45% by weight of butadiene and 10% by weight of itaconic acid.

The following examples and comparative examples illustrate the present invention. The percentages and ratios used in the examples are by weight unless otherwise indicated.

COMPARATIVE EXAMPLES 1 to 5

Extrapolation of the state of the art regarding photothermographic materials with IR-spectral sensitizers disclosed in U.S. Pat. No. 5,441,866 and EP-A 616 014 to photothermographic materials with photo-addressable thermally developable elements coated from aqueous media:

Silver Behenate Dispersion

Silver behenate was prepared by dissolving 34 (0.1 moles) of behenic acid in 340 mL of 2-propanol at 65° C. converting the behenic acid to sodium behenate by adding 400 mL of 0.25M aqueous sodium hydroxide to the stirred behenic acid solution and finally adding 250 mL of 0.4M aqueous silver nitrate the silver behenate precipitating out. This was filtered off and then washed with a mixture of 10% by volume of 2-propanol and 90% by volume of deionized water to remove residual sodium nitrate.

SENSI C01:

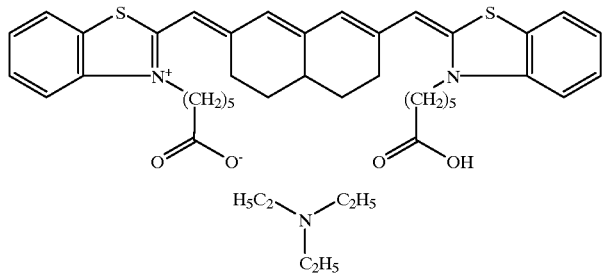

the following IR-sensitizing dyes according to EP-A 616 014:

SENSI C02:

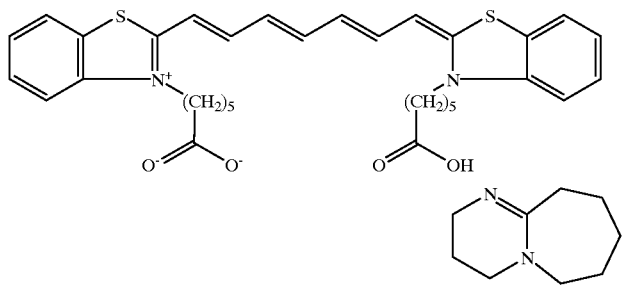

SENSI C03:

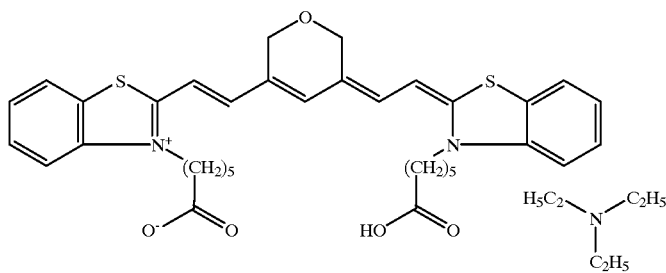

After drying at 45° C. for 12 h, the silver behenate was dispersed in deionized water with the anionic dispersion agents Ultravon™ W and Mersolat™ H to produce, after rapid mixing using a high speed impingement mill (rotor-stator mixer) to obtain a paste and homogenization with a microfluidizer, a finely divided and stable dispersion containing 20% by weight of silver behenate, 2.1% by weight of Ultravon™ W and 0.203% by weight of Mersolat™ H. The pH of the resulting dispersion was adjusted to about 6.5.

The following ingredients were then added with stirring to 3.0 g of the silver behenate dispersion: 2 g of a 2.22% by weight aqueous solution of 3-(triphenyl-phosphonium) propionic acid bromide (PC02), corresponding to a concentration of 8 mol % of PC02 with respect to silver behenate, at a pH of 4 to accomplish in situ conversion of part of the silver behenate to silver bromide. After 10 minutes further stirring, the supersensitizer was added with stirring as a solution in water and/or methanol, as specified in table 1, immediately followed by the IR-spectral sensitizer as a solution or dispersion in water and/or methanol as specified in table 1. After stirring for a further 15 minutes 2 of a 30% by weight concentration of BINDER 01 at a pH of 4 was added with stirring followed by 2 of a 4.5% by weight aqueous solution of 3-(3',4'-dihydroxyphenyl)propionic acid.

TABLE 1

| Comparative example number | IR-sensitizer code | Weight of solution [g] | Conc. of solution [% by wt] | code | Weight of solution [g] | Conc. of solution [% by wt] |
|---|---|---|---|---|---|---|
| 1 | SENSI C01 | 0.180 | 0.3 (MeOH) | — | — | — |
| 2 | SENSI C01 | 0.180 | 0.3 (MeOH) | SS-08 | 0.2 | 2 (MeOH) |
| 3 | SENSI C02 | 0.270 | 0.2 (MeOH) | — | — | — |
| 4 | SENSI C02 | 0.270 | 0.2 (MeOH) | SS-08 | 0.4 | 2 (MeOH) |
| 5 | SENSI C02 | 0.270 | 0.2 (MeOH) | SS-09 | 0.8 | 1 (MeOH) |

Header row: IR-sensitizer columns, supersensitizer columns.

Coating and Drying of the Photothermographic Material

A subbed polyethylene terephthalate support having a thickness of 100 $\mu$m was doctor blade-coated with the silver behenate/silver bromide dispersion at a blade setting of 90 $\mu$m. After drying for several minutes at 40° C. on the coating bed, the emulsion layer was dried for 1 hour in a hot air oven at 40° C.

Image-wise Exposure and thermal Processing

The photothermographic materials of COMPARATIVE EXAMPLES 1 to 5 were exposed to a beam of a 836 nm diode laser type HL 8318G from HITACHI with a nominal power of 12.8 mW focussed to give a spot meter (1/e$^2$) of 115 $\mu$m, scanned at a speed of 5 m/s with a pitch of 63 $\mu$m and an overlap of 30% through a wedge filter with optical density varying between 0 and 3.3 in optical density steps of 0.15. The maximum exposure (filter optical density=0) was about 50 J/m$^2$.

Thermal processing was carried out on a heated metal block for 5 to 15 s at 105 to 115° C., as specified in table 2. The maximum and minimum optical densities, $D_{max}$ and $D_{min}$, of the images were measured in transmission with a MacBeth™ TR924 densitometer through a visible filter.

The $D_{max}$- and $D_{min}$-values obtained upon image-wise exposure and thermal processing of the photothermographic recording materials of COMPARATIVE EXAMPLES 1 to 5 together with the IR-sensitizer, supersensitizer, molar ratio of supersensitizer to IR-sensitizer and the thermal processing conditions used are summarized in table 2.

TABLE 2

| Comparative example number | IR-sensitizer code | supersensitizer code | moles super-sensitizer/ mol IR-sensitizer | temperature [° C.] | time [s] | $D_{max}$ | $D_{min}$ |
|---|---|---|---|---|---|---|---|
| 1 | SENSI C01 | — | — | 105 | 15 | 0.20 | 0.20 |
| 2# | SENSI C01 | SS-08 | 36:1 | 105 | 15 | 0.24 | 0.14 |
| 3 | SENSI C02 | — | — | 105 | 15 | 0.25 | 0.25 |
| 4* | SENSI C02 | SS-08 | 74:1 | 105 | 15 | 0.13 | 0.13 |
| 5 | SENSI C02 | SS-09 | 31:1 | 105 | 15 | 0.65 | 0.12 | invention example 1 of U.S. Pat. No. 5,441,586 has same supersensitizer/IR-sensitizer combination, but in molar ratio 20:1;
*invention example 3 of EP-A 616 014 has same supersensitizer/IR-sensitizer combination, but in molar ratio 59:1.

A comparison of the results obtained for the photothermographic recording materials of COMPARATIVE EXAMPLES 1 and 2 coated from aqueous media, shows that no sensitization was observed with SENSI C01 and that no supersensitization was observed with the supersensitizer SS-08. A comparison of the results obtained for the photothermographic recording materials of COMPARATIVE EXAMPLES 4 and 5 with those for COMPARATIVE EXAMPLE 3, shows that no sensitization was observed with SENSI C02 and that little supersensitization was observed with the supersensitizers SS-08 and SS-09.

These results show that the state of the art regarding infra-red sensitization of photothermographic recording materials as represented by example 1 of U.S. Pat. No. 5,441,586 and example 3 of EP-A 616 014 cannot be readily extrapolated to such materials coated from aqueous media.

INVENTION EXAMPLES 1 to 4 and COMPARATIVE EXAMPLES 6 to 8

Infra-red Sensitization with Dyes and Supersensitizers According to the Present Invention A dispersion of silver behenate was prepared as described for COMPARATIVE EXAMPLES 1 to 5 and the photothermographic emulsion prepared also as described for COMPARATIVE EXAMPLES 1 to 5 except that the IR-sensitizer, IR-sensitizer solution, weight of IR-sensitizer solution, supersensitizer, sensitizer solution and weight of supersensitizer solution used for each photothermographic emulsion is as given in table 3.

TABLE 3

| | IR-sensitizer | | | supersensitizer | | |
| --- | --- | --- | --- | --- | --- | --- |
| | code | Weight of solution [g] | Conc. of solution [% by wt] | code | Weight of solution [g] | Conc. of solution [% by wt] |
| Invention example number | | | | | | |
| 1 | SENSI 01 | 0.18 | 0.3 (MeOH) | SS-01 | 1.2 | 0.25 (MeOH) |
| 2 | SENSI 01 | 0.18 | 0.3 (MeOH) | SS-09 | 0.8 | 1.0 (MeOH) |
| 3 | SENSI 02 | 0.18 | 0.3 (MeOH) | SS-01 | 1.2 | 0.25 (MeOH) |
| 4 | SENSI 06 | 0.046 | 0.3 (MeOH) | SS-01 | 1.2 | 0.25 (MeOH) |
| Comparative example number | | | | | | |
| 6 | SENSI 01 | 0.18 | 0.3 (MeOH) | — | — | — |
| 7 | SENSI 02 | 0.18 | 0.3 (MeOH) | — | — | — |
| 8 | SENSI 06 | 0.046 | 0.3 (MeOH) | — | — | — |

*dispersion with ULTRAVON ™ W as surfactant
MeOH = methanol

The photothermographic emulsions of INVENTION EXAMPLES 1 to 4 and COMPARATIVE EXAMPLES 6 to 8 were coated as described for COMPARATIVE EXAMPLES 1 to 5 and then image-wise exposed, thermally processed and the resulting images evaluated as described for COMPARATIVE EXAMPLES 1 to 5.

The $D_{max}$- and $D_{min}$-values obtained upon image-wise exposure and thermal processing of the photothermographic recording materials of INVENTION EXAMPLES 1 to 4 and COMPARATIVE EXAMPLES 6 to 8 together with the IR-sensitizer, supersensitizer, molar ratio of supersensitizer to IR-sensitizer and the thermal processing conditions used are summarized in table 4.

TABLE 4

| | IR-sensitizer code | super-sensitizer code | moles super-sensitizer/ mol IR-sensitizer | thermal processing conditions | | | |
| --- | --- | --- | --- | --- | --- | --- | --- |
| | | | | temperature [° C.] | time [s] | $D_{max}$ | $D_{min}$ |
| Invention example number | | | | | | | |
| 1 | SENSI 01 | SS-01 | 3:1 | 105 | 15 | 1.59 | 0.17 |
| 2 | SENSI 01 | SS-09 | 25:1 | 105 | 15 | 0.89 | 0.12 |
| 3 | SENSI 02 | SS-01 | 4:1 | 105 | 15 | 0.75 | 0.15 |
| 4 | SENSI 06 | SS-01 | 18:1 | 105 | 15 | 0.58 | 0.15 |
| Comparative example number | | | | | | | |
| 6 | SENSI 01 | — | — | 105 | 15 | 0.30 | 0.30 |
| 7 | SENSI 02 | — | — | 105 | 15 | 0.15 | 0.15 |
| 8 | SENSI 06 | — | — | 105 | 15 | 0.25 | 0.25 |

The results in table 4 show that the IR-sensitizer dyes of the present invention are efficiently supersensitized by stilbene-supersensitizers (SS-01, SS-02, SS-03, SS-04 and SS-07) and mercapto-supersensitizers (SS-09), being examples of the general class of supersensitizers, in photothermographic recording materials comprising photo-addressable thermally developable elements coated from aqueous media.

Having described in detail preferred embodiments of the current invention, it will now be apparent to those skilled in the art that numerous modifications can be made therein without departing from the scope of the invention as defined in the following claims.

We claim:

1. An aqueous dispersion for the production of a photothermographic recording material, comprising aqueous media having dispersed therein a substantially light-insensitive organic silver salt, photosensitive silver halide in catalytic association with said substantially light-insensitive organic silver salt, in a quantity of 0.1 to 35 mol % relative to said organic silver salt and spectrally sensitized to infrared light with a dye, a supersensitizer for said dye, and a binder, wherein said binder is a water soluble polymer, a water-dispersible polymer or mixtures thereof and wherein said dye corresponds to formula

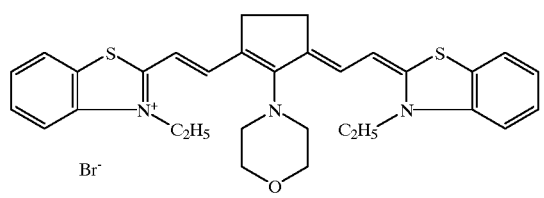

2. The aqueous dispersion according to claim 1, wherein said supersensitizer is a compound selected from the group consisting of stilbene compounds, hydrazine compounds, hetero-aromatic mercapto compounds, hetero-aromatic disulfide compounds and triazine compounds.

3. The aqueous dispersion according to claim 1, wherein said aqueous dispersion further comprises an antihalation dye.

4. The aqueous dispersion according to claim 1, wherein said substantially light-insensitive organic silver salt is a silver salt of a carboxylic acid.

5. A production process for producing a photothermographic recording material comprising a substantially light-insensitive organic silver salt, photosensitive silver halide in catalytic association with said substantially light-insensitive organic silver salt, in a quantity of 0.1 to 35 mol % relative to said organic silver salt and spectrally sensitized to infrared light with a dye, a supersensitizer for said dye, a reducing agent in thermal working relationship with said substantially light-insensitive organic silver salt and a binder, said process comprising the steps of: (i) preparing an aqueous dispersion comprising said substantially light-insensitive organic silver salt, said photosensitive silver halide spectrally sensitized to infra-red light with said dye, said supersensitizer for said dye, said reducing agent and said binder; and (ii) coating said aqueous dispersion onto a support, wherein said binder comprises a water soluble polymer, a water-dispersible polymer or a water soluble polymer and a water-dispersible polymer and, wherein said dye corresponds to the formula

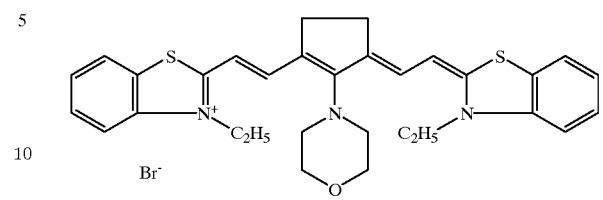

6. The production process according to claim 5, wherein said supersensitizer is a compound selected from the group consisting of stilbene compounds, hydrazine compounds, hetero-aromatic mercapto compounds, hetero-aromatic disulfide compounds and triazine compounds.

7. The production process according to claim 5, wherein said photothermographic recording material further comprises an antihalation dye.

8. The production process according to claim 5, wherein said photo-addressable thermally developable element is provided with a protective layer.

9. The production process according to claim 5, wherein said substantially light-insensitive organic silver salt is a silver salt of a carboxylic acid.

10. An aqueous dispersion for the production of a photothermographic recording material, said dispersion comprising aqueous media having dispersed therein a substantially light-insensitive organic silver salt, photosensitive silver halide in catalytic association with said substantially light-insensitive organic silver salt, in a quantity of 0.1 to 35 mol % relative to said organic silver salt and spectrally sensitized to infra-red light with dye, a supersensitizer for said dye, and a binder, wherein said binder is a water soluble polymer, a water-dispersible polymer or mixtures thereof and wherein said dye corresponds to the formula

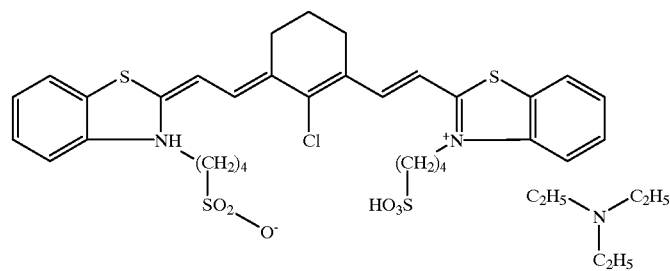

11. An aqueous dispersion for the production of a photothermographic recording material, said dispersion comprising aqueous media having dispersed therein a substantially light-insensitive organic silver salt, photosensitive silver halide in catalytic association with said substantially light-insensitive organic silver salt, in a quantity of 0.1 to 35 mol % relative to said organic silver salt and spectrally sensitized to infra-red light with a dye, a supersensitizer for said dye, and a binder, wherein said binder is water soluble polymer, a water-dispersible polymer or mixtures thereof and wherein said dye corresponds to the formula

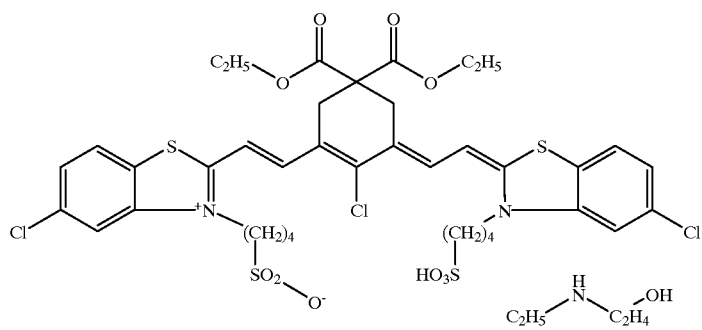

13. An aqueous dispersion for the production of a photothermographic recording material, Siad dispersion comprising aqueous media having dispersed therein a substantially light-insensitive organic silver salt, photosensitive silver halide in catalytic association with said substantially light-insensitive organic silver salt, in a quantity of 0.1 to 35 mol % relative to said organic silver salt and spectrally sensitized to infra-red light with a dye, a supersensitizer for said dye, and a binder, wherein said binder is a water soluble polymer, a water-dispersible polymer or mixtures thereof and wherein said dye corresponds to the formula 12. An aqueous dispersion for the production of a photothermographic recording material, said dispersion comprising aqueous media having dispersed therein a substantially light-insensitive organic silver salt, photosensitive silver halide in catalytic association with said substantially light-insensitive organic silver salt, in a quantity of 0.1 to 35 mol % relative to said organic silver salt and spectrally sensitized to infra-red light with a dye, a supersensitizer for said dye, and a binder, wherein said binder is a water soluble polymer, a water-dispersible polymer or mixtures thereof and wherein said dye corresponds to the formula

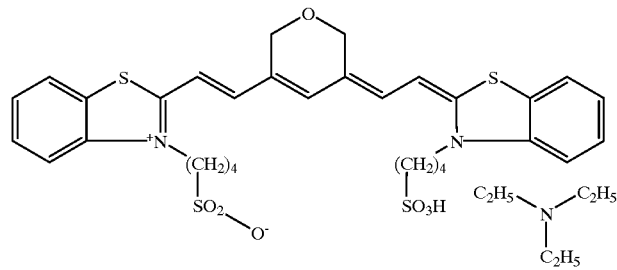

60

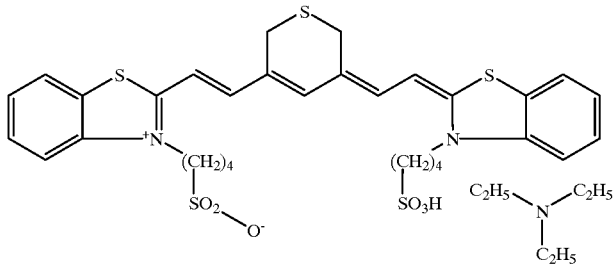

14. An aqueous dispersion for the production of a photothermographic recording material said dispersion comprising aqueous media having dispersed therein a substantially light-insensitive organic silver salt, photosensitive silver halide in catalytic association with said substantially light-insensitive organic silver salt, in a quantity of 0.1 to 35 mol % relative to said organic silver salt and spectrally sensitized to infra-red light with a dye, a supersensitizer for said dye, and a binder, wherein said binder is a water soluble polymer, a water-dispersible polymer or mixtures thereof and wherein said dye corresponds to the formula organic silver salt, in a quantity of 0.1 to 35 mol % relative to said organic silver salt and spectrally sensitized to infra-red light with a dye, a supersensitizer for said dye, a reducing agent in thermal working relationship with said substantially light-insensitive organic silver salt and a binder, said process comprising the steps of: (i) preparing an aqueous dispersion comprising said substantially light-insensitive organic silver salt, said photosensitive silver halide spectrally sensitized to infra-red light with said dye, said supersensitizer for said dye, said reducing agent and said binder; and (ii) coating said aqueous dispersion onto a

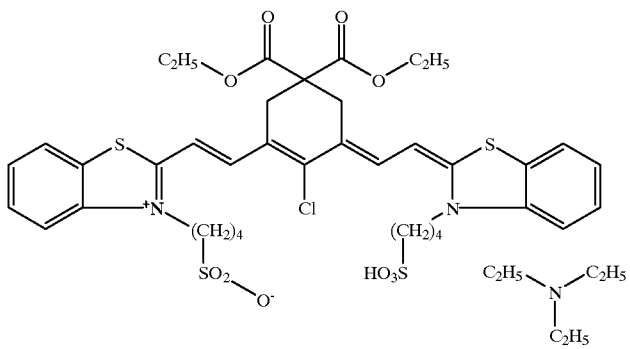

15. A production process for producing a photothermographic recording material comprising a substantially light-insensitive organic silver salt, photosensitive silver halide in catalytic association with said substantially light-insensitive support, wherein said binder is a water soluble polymer, a water-dispersible polymer or a water soluble polymer and a water-dispersible polymer and wherein said dye corresponds to the formula

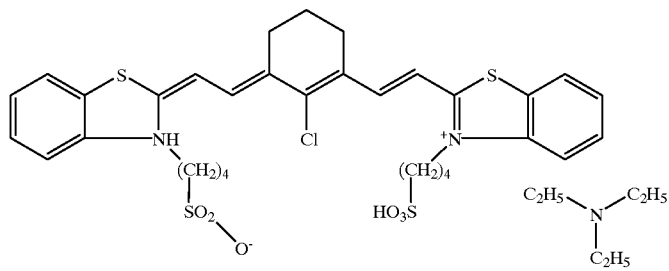

16. A production process for producing a photothermographic recording material comprising a substantially light-insensitive organic silver salt, photosensitive silver halide in catalytic association with said substantially light-insensitive organic silver salt, in a quantity of 0.1 to 35 mol % relative to said organic silver salt and spectrally sensitized to infra-red light with a dye, a supersensitizer for said dye, a reducing agent in thermal working relationship with said substantially light-insensitive organic silver salt and a binder, said process comprising the steps of: (i) preparing an aqueous dispersion comprising said substantially light-insensitive organic silver salt, said photosensitive silver halide spectrally sensitized to infra-red light with said dye, said supersensitizer for said dye, said reducing agent and said binder; and (ii) coating said aqueous dispersion onto a support, wherein said binder is a water soluble polymer, a water-dispersible polymer or water soluble polymer and wherein said dye corresponds to the formula 17. A production process for producing a photothermographic recording material, comprising a substantially light-insensitive organic silver salt, photosensitive silver halide in catalytic association with said substantially light-insensitive organic silver salt, in a quantity of 0.1 to 35 mol % relative to said organic silver salt an spectrally sensitized to infra-red light with a dye, a supersensitizer for said dye, a reducing agent in thermal working relationship with said substantially light-insensitive organic silver salt and a binder, said process comprising the steps of: (i) preparing an aqueous dispersion comprising said substantially light-insensitive organic silver salt, said photosensitive silver halide spectrally sensitized to infra-red light with said dye, said supersensitizer for said dye, said reducing agent and said binder; and (ii) coating said aqueous dispersion onto a support, wherein said binder is a water soluble polymer a water-dispersible polymer or a water soluble polymer and a water-dispersible polymer and wherein said dye corresponds to the formula

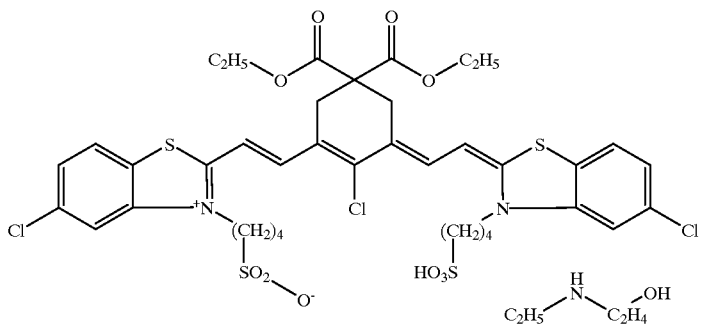

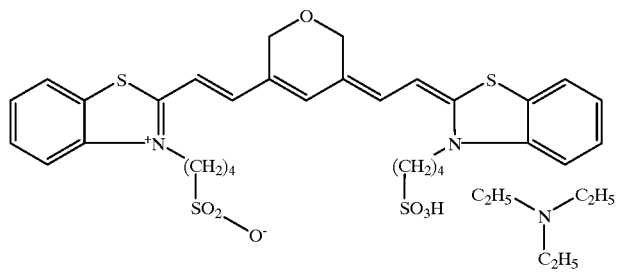

18. A production process for producing a photothermographic recording material comprising a substantially light-insensitive organic silver salt, photosensitive silver halide in catalytic association with said substantially light-insensitive organic silver salt, in a quantity of 0.1 to 35 mol % relative to said organic silver salt and spectrally sensitized to infra-red light with a dye, a supersensitizer for said dye, a reducing agent in thermal working relationship with said substantially light-insensitive organic silver salt and a binder, said process comprising the steps of: (i) preparing an aqueous dispersion comprising said substantially light-insensitive organic silver slat, said photosensitive silver halide spectrally sensitized to infra-red light with said dye, said supersensitizer for said dye, said reducing agent and said binder; and (ii) coating said aqueous dispersion onto a support, wherein said binder is a water-dispersible polymer or a water soluble polymer or a water soluble polymer and a water-dispersible polymer and wherein said dye corresponds to the formula 19. A production process for producing a photothermographic recording material comprising a substantially light-insensitive organic silver salt, photosensitive silver halide in catalytic association with said substantially light-insensitive organic silver salt, in a quantity of 0.1 to 35 mol % relative to said organic silver salt and spectrally sensitized to infra-red light with a dye, a supersensitizer for said dye, a reducing agent in thermal working relationship with said substantially light-insensitive organic silver salt and a binder, said process comprising the steps of: (i) preparing an aqueous dispersion comprising said substantially light-insensitive organic silver salt, said photosensitive silver halide spectrally sensitized to infra-red light with said dye, said supersensitizer for said dye, said reducing agent and said binder; and (ii) coating said aqueous dispersion onto a support, wherein said binder is a water-soluble polymer, a water-dispersible polymer or a water-soluble polymer and a water-dispersible polymer and wherein said dye corresponds to the formula

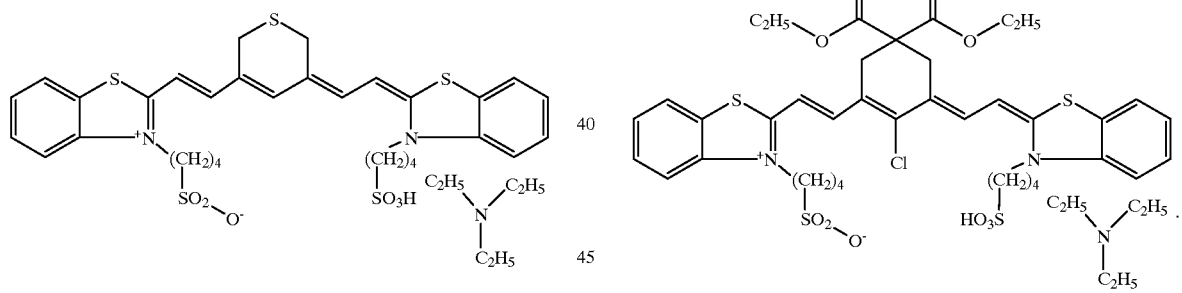

* * * * *